(12) United States Patent
Nanba et al.

(10) Patent No.: US 7,964,530 B2
(45) Date of Patent: Jun. 21, 2011

(54) ACTIVATED CARBON AND PROCESS OF MAKING THE SAME

(75) Inventors: Youichi Nanba, Minato-ku (JP);
Takashi Mori, Minato-ku (JP); Susumu Nakazaki, Minato-ku (JP)

(73) Assignee: Showa Denko K.K., Tokyo (JP)

( * ) Notice: Subject to any disclaimer, the term of this patent is extended or adjusted under 35 U.S.C. 154(b) by 499 days.

(21) Appl. No.: 11/917,881

(22) PCT Filed: Sep. 27, 2006

(86) PCT No.: PCT/JP2006/319900
§ 371 (c)(1),
(2), (4) Date: Dec. 17, 2007

(87) PCT Pub. No.: WO2007/037508
PCT Pub. Date: Apr. 5, 2007

(65) Prior Publication Data
US 2009/0080142 A1 Mar. 26, 2009

Related U.S. Application Data

(60) Provisional application No. 60/723,941, filed on Oct. 6, 2005, provisional application No. 60/733,210, filed on Nov. 4, 2005, provisional application No. 60/752,395, filed on Dec. 22, 2005.

(30) Foreign Application Priority Data

| | | |
|---|---|---|
| Sep. 29, 2005 | (JP) | ................................ 2005-283321 |
| Oct. 27, 2005 | (JP) | ................................ 2005-312286 |
| Dec. 16, 2005 | (JP) | ................................ 2005-362773 |

(51) Int. Cl.
*C01B 31/08* (2006.01)
*C01B 31/00* (2006.01)
*C01B 31/02* (2006.01)
*B01J 20/26* (2006.01)
*H01G 9/00* (2006.01)

(52) U.S. Cl. ........ 502/416; 502/427; 502/402; 361/502; 423/414; 423/445 R

(58) Field of Classification Search .................... None
See application file for complete search history.

(56) References Cited

U.S. PATENT DOCUMENTS

| | | |
|---|---|---|
| 7,232,790 B2 | 6/2007 | Tanaka et al. |
| 2006/0035785 A1 | 2/2006 | Tanaka |
| 2007/0211411 A1 | 9/2007 | Tanaka et al. |

FOREIGN PATENT DOCUMENTS

| | | |
|---|---|---|
| WO | 03/024868 A1 | 3/2003 |
| WO | 2004/043859 A2 | 5/2004 |
| WO | WO 2004043859 A2 * | 5/2004 |

* cited by examiner

*Primary Examiner* — Melvin Curtis Mayes
*Assistant Examiner* — Guinever S Gregorio
(74) *Attorney, Agent, or Firm* — Sughrue Mion, PLLC

(57) ABSTRACT

An activated carbon having the highest peak D within the range of 1.0 nm to 1.5 nm, in which the peak D is from 0.012 to 0.050 $cm^3/g$ and is from 2% to 32% to a total pore volume, in pore size distribution as calculated by BJH method from $N_2$-adsorption isotherm at 77.4 K. An electric double layer capacitor comprising the polarizable electrode which comprises the activated carbon, carbon fiber, carbon black, and binder.

46 Claims, 2 Drawing Sheets

[FIG. 1]
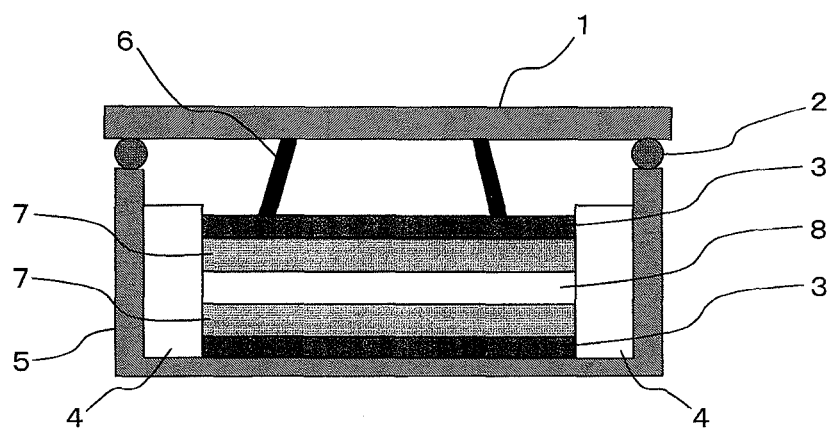
[FIG. 2]
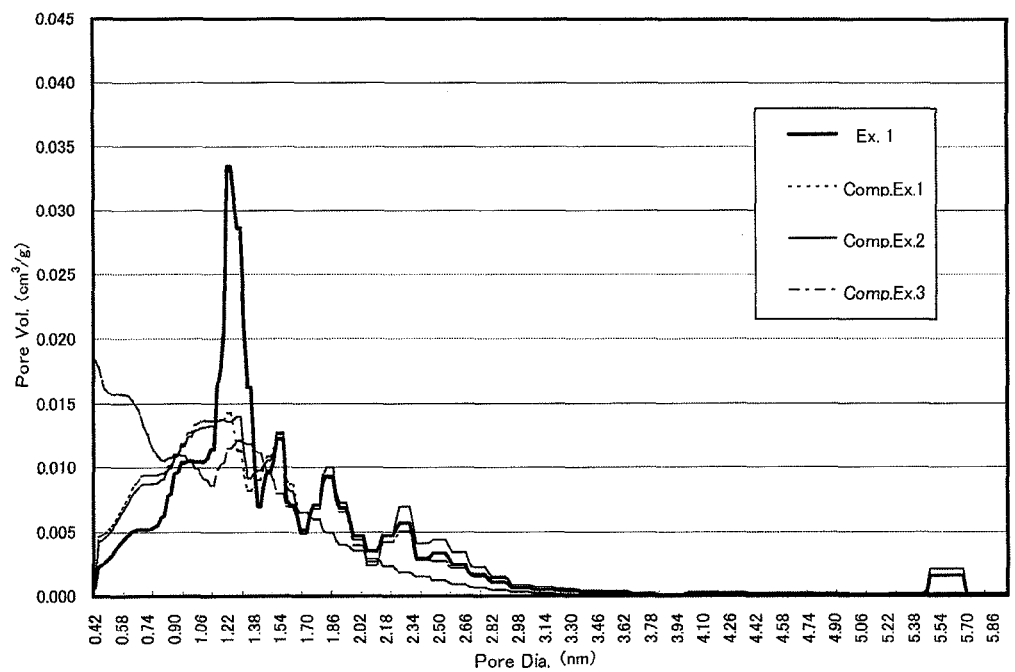

[FIG.3]
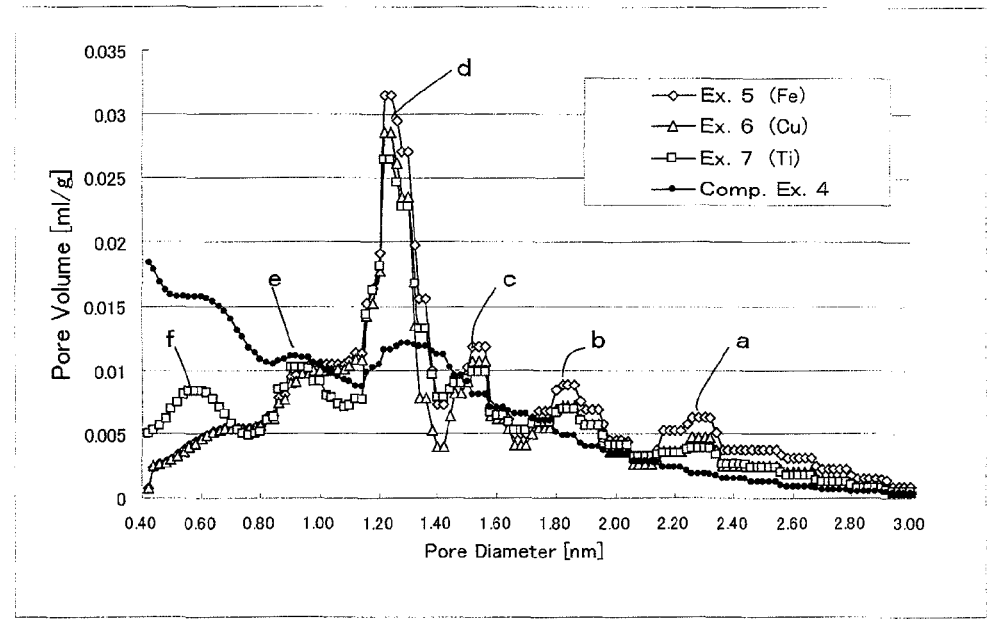
[FIG.4]
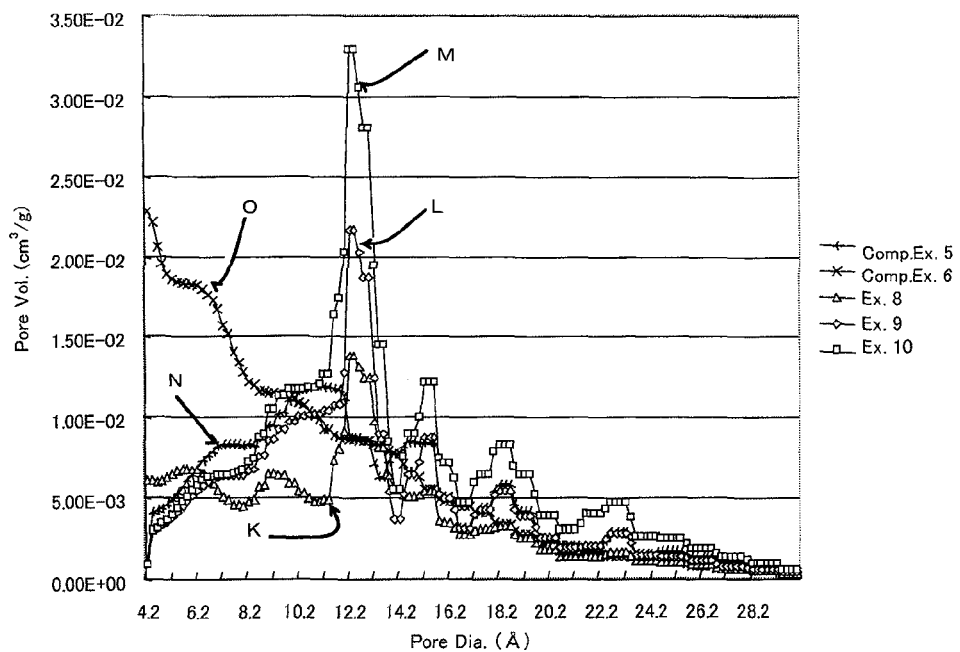

US 7,964,530 B2

ACTIVATED CARBON AND PROCESS OF MAKING THE SAME

This application claims benefit pursuant to 35 U.S.C. §119 (e)(1) of Provisional Application No. 60/723,941 filed on Oct. 6, 2005, Provisional Application No. 60/733,210 filed on Nov. 4, 2005, and Provisional Application No. 60/752,395 filed on Dec. 22, 2005 pursuant to 35 U.S.C. §111(b), the disclosures of which are incorporated herein by reference. This application is based on Japanese Patent Application No. 2005-283321 filed on Sep. 29, 2005, Japanese Patent Application No. 2005-312286 filed on Oct. 27, 2005, and Japanese Patent Application No. 2005-362773 filed on Dec. 16, 2005, the contents of which are incorporated herein by reference.

TECHNICAL FIELD

The invention relates to an activated carbon and a process of making the activated carbon. Especially, the invention relates to an activated carbon having good gas stocking property, and high adsorption quantity for gas such as hydrocarbon gas having low molecular weight even if BET specific surface area is low. Also the invention relates to an activated carbon useful as material for polarizable electrode to obtain electric double layer capacitor having good property of charge and discharge and low internal resistance under cryogenic circumstance, and relates to a process of making the activated carbon.

BACKGROUND ART

An activated carbon is known as adsorbent, is in an important position for various industrial field such as food, medicine, housing, automobile, chemical industry. Also the activated carbon is considered as adsorbent for stocking gas mainly containing natural gas which is substitute for petroleum resource such as gasoline.

Natural gas mainly contains methane or ethane. Generally speaking, an activated carbon being larger in BET specific surface area and being larger in volume of micro pore having pore diameter of 1 nm or less advances more adsorption of gas having small molecular size such as methane, ethane, or other hydrocarbon gas having low molecular weight, or hydrogen. Adjustment of activated carbon structure such as pore diameter, pore volume, and pore configuration is researched to improve adsorption property of activated carbon, i.e. to enlarge selectively adsorption quantity for gas having set molecular size. However, activated carbon having larger specific surface area is lower in a packing property into tank.

JP-A-06-55067 discloses an adsorbent obtained by carrying metallic simple substance or metallic compound, which has chemical adsorption ability for methane, on an activated carbon having BET specific surface area of approximately 750 m²/g or more.

JP-A-07-155587 suggests an activated carbon having a pore volume of 2.5 to 4.0 cm³/g, an average pore diameter of 2.1 to 4.0 nm, and specific surface area of 1600 to 2500 m²/g. JP-A-07-155587 discloses the activated carbon can be obtained by activating pore-containing carbonaceous material being at least 100 m²/g in a specific surface area with metallic compound in the 8th group.

In JP-A-2001-122608 is described an activated carbon obtained by activating with alkali metallic compound. The activated carbon has volume of micro pore, which has pore diameter of approximately 0.7 to 1.2 nm, of 50% or more to the total pore volume.

An activated carbon is useful for material of a polarizable electrode in an electric double layer capacitor. An electric double layer capacitor is quickly chargable and dischargable, tough against overcharge or overdischarge, long in life for cause of no chemical reaction, workable under wide range of temperature, and easy on the environment for cause of heavy metal free, and has other property which battery does not have. An electric double layer capacitor is mainly employed for a memory backup power supply and so on. An electric double layer capacitor is researched in application to electric power storing system or engine assist for hybrid car by assembling with battery such as solar battery and fuel cell.

An electric double layer capacitor comprises a pair of polarizable electrodes as cathode and anode made from material containing an activated carbon, in which the pair of polarizable electrodes set facing each other in solution containing electrolytic ion, and a separator is interposed between the polarizable electrodes. Impressing of direct current voltage into the electrodes causes drawing anion in solution near cathode (positive electrode) and drawing cation in solution near anode (negative electrode), making an electric double layer at the interface between electrode and solution. And the electric double layer supplies electric energy.

Therefore, using of activated carbon having larger specific surface area have been researched to make larger electric double layer. The using of this activated carbon enlarges an electric capacity per mass (F/g), but density of electrode is lowered. Consequently an electric capacity per volume (F/cm³) is not as large as expectation.

There is suggestion in JP-A-11-317333, JP-A-2000-68164, and JP-A-2000-68165 that an activated carbon, which is made by activating with alkali metallic compound, having micro-crystalline structure similar to graphite structure, and having distance between layers of 0.365 nm to 0.385 nm, is used as material for polarizable electrode. An electric double layer capacitor, which the activated carbon is employed as material for polarizable electrode, has large electric capacity per volume (F/cm³) and thus the activated carbon may be good material in view of an electric capacity per volume.

In producing method for activated carbon comprising a step of activating coke with potassium hydroxide (KOH) to form pore, it is difficult to control suitable pore diameter of activated carbon for electric double layer capacitor workable under cryogenic temperatures.

JP-B-319563 or JP-A-2004-182511 produces an activated carbon having meso-pore being within 2 to 50 nm in a pore diameter obtained by activating raw material with steam, in which the raw material is obtained by mixing pitch having low softening point and metallic compound.

JP-A-2004-175660 filed by the applicant shows an activated carbon having BET specific surface area of 10 to 2000 m²/g containing alkaline earth metallic compound inside particle. It is shown that the activated carbon having a pore volume of 0.02 cm³/g or more, in which the pore volume is within 2.0 to 5.0 nm in a pore diameter under pore size distribution as calculated by BJH method, can enlarge an electric capacity of electric double layer capacitor.

DISCLOSURE OF INVENTION

According to the review of the inventors, in JP-A-6-55067, the activated carbon having a specific surface area of 3000 m²/g reaches more than 200 mg/g in a methane adsorption quantity, but so large specific surface area lowers quantity of packing in tank etc. Activated carbon having specific surface area suitable for filling in tank etc. of about 1500 m²/g performs methane adsorption quantity of 100 mg/g or less.

The activated carbon in JP-A-7-155587 is low efficiency of pore utilization for adsorption of gas such as methane, since the pore is filled or squashed with metallic compound on the surface.

The activated carbon in JP-A-2001-122608 has methane adsorption quantity of 100 mg/g or less.

The object of the invention is to provide an activated carbon suitable for gas adsorbent which can efficiently adsorb and stock methane or natural gas mainly containing methane under low relative pressure, and can largely fill in storage tank to downsize gas storage units; to provide a canister (a preventing device from evaporating gasoline) employing adsorbent which comprises the activated carbon; to provide storage units for natural gas, natural gas automobile and so on.

An electric double layer capacitor is usually premised on using under room temperature in the vicinity of 25° C. This performs relatively high electric capacity under room temperature. However, under cryogenic temperatures in the vicinity of −30° C., charge and discharge capacitance remarkably decreases, and internal resistance increases. The main cause is that escalation of viscosity of electrolytic solution under cryogenic temperatures decreases an electrolytic ion mobility in pore of activated carbon.

Increasing pore volume ($cm^3/g$) of activated carbon was conventionally attempted in order to improve electrolytic ion mobility under cryogenic temperatures. When only increasing pore volume ($cm^3/g$) decreases internal resistance under cryogenic temperatures, density of activated carbon in electrode declines, which allows to drop an electric capacity per volume ($F/cm^3$).

The other object of the invention is to provide an activated carbon and an electric double layer capacitor which has good property of charge and discharge and low internal resistance especially under cryogenic temperatures (in the vicinity of −30° C.).

After the inventors did every research to achieve the goal, they found out that an activated carbon having the highest peak D within the range of 1.0 to 1.5 nm in pore size distribution, in which the peak D is 0.012 to 0.050 $cm^3/g$, and 2 to 32% to total pore volume, performs high methane adsorption quantity regardless of low specific surface area, and gives an electric double layer capacitor which has good property of charge and discharge and low internal resistance under cryogenic temperatures (ex. −30° C.).

The inventors further found out that an activated carbon, under pore size distribution as calculated by BJH method from adsorption isotherm, having peak a within the range of 2.1 to 2.4 nm in a pore diameter, peak b within the range of 1.7 to 2.1 nm in a pore diameter, peak c within the range of 1.4 to 1.7 nm in a pore diameter, and peak d within the range of 1.1 to 1.4 nm in a pore diameter, or an activated carbon having peak a within the range of 2.1 to 2.4 nm in a pore diameter, peak b within the range of 1.7 to 2.1 nm in a pore diameter, peak c within the range of 1.4 to 1.7 nm in a pore diameter, peak d within the range of 1.1 to 1.4 nm in a pore diameter, peak e within the range of 0.8 to 1.1 nm in a pore diameter, peak f within the range of 0.4 to 0.8 nm in a pore diameter, and having particular ratio of these areas each enclosed with pore diameter axis and distribution curve of each peak within the above pore diameter range, can give an electric double layer capacitor which has good property of charge and discharge and low internal resistance under cryogenic temperatures (ex. −30° C.). The invention is made on the found out knowledge.

The invention specifically comprises the following modes.

(1) An activated carbon having at least one peak within the range of 1.0 nm to 1.5 nm in pore size distribution, wherein the highest peak (peak D) is 0.02 $cm^3/g$ to 0.035 $cm^3/g$, wherein the pore size distribution is calculated by BJH method from $N_2$-adsorption isotherm at 77.4K.

(2) The activated carbon according to (1), having a specific surface area, as measured by BET method on $N_2$-adsorption, of 1500 $m^2/g$ to 2200 $m^2/g$.

(3) An activated carbon having the highest peak being a peak D within the range of 1.0 nm to 1.5 nm, in which the peak D is from 0.012 $cm^3/g$ to 0.05 $cm^3/g$ and is from 2% to 32% to a total pore volume, in pore size distribution as calculated by BJH method from $N_2$-adsorption isotherm at 77.4 K.

(4) The activated carbon according to (3), having a specific surface area, as measured by BET method on $N_2$-adsorption, of 1100 $m^2/g$ to 2200 $m^2/g$.

(5) The activated carbon according to any one of (1) to (4), having a peak C within the range of 1.5 nm to 1.7 nm in pore size distribution.

(6) The activated carbon according to any one of (1) to (5), having a peak B within the range of 1.7 nm to 2.0 nm in pore size distribution.

(7) The activated carbon according to any one of (1) to (6), having a peak A within the range of 2.0 nm to 2.5 nm in pore size distribution.

(8) An activated carbon, in pore size distribution as calculated by BJH method from $N_2$-adsorption isotherm at 77.4 K, having a peak a within the range of 2.1 nm to 2.4 nm in a pore diameter, a peak b within the range of 1.7 nm to 2.1 nm in a pore diameter, a peak c within the range of 1.4 nm to 1.7 nm in a pore diameter, and a peak d within the range of 1.1 nm to 1.4 nm in a pore diameter, and having area d of 3.7 to 4.8, area c of 1.6 to 2.3 and area b of 1.6 to 2.1, supposing that area a is 1, in which the area a, the area b, the area c, and the area d are each enclosed with pore diameter axis and distribution curve of each peak within the above pore diameter range.

(9) An activated carbon, in pore size distribution as calculated by BJH method from $N_2$-adsorption isotherm at 77.4 K, having a peak a within the range of 2.1 nm to 2.4 nm in a pore diameter, a peak b within the range of 1.7 nm to 2.1 nm in a pore diameter, a peak c within the range of 1.4 nm to 1.7 nm in a pore diameter, a peak d within the range of 1.1 nm to 1.4 nm in a pore diameter, a peak e within the range of 0.8 nm to 1.1 nm in a pore diameter, and a peak f within the range of 0.4 nm to 0.8 nm in a pore diameter, and having area f of 2.2 to 2.5, area e of 2.3 to 2.5, area d of 4.6 to 4.8, area c of 2.1 to 2.3 and area b of 1.9 to 2.1, supposing that area a is 1, in which the area a, the area b, the area c, the area d, the area e, and the area f are each enclosed with pore diameter axis and distribution curve of each peak within the above pore diameter range.

(10) A process of making an activated carbon comprising steps of:

carbonizing pitch in the presence of 7000 ppm or more in metallic element concentration of chemical Z containing any of elements in the 2nd group, any of elements in the 3rd to 11th groups of the 4th period, or element in the 4th group of the 5th period on periodic table to obtain a graphitizable coke, activating the graphitizable coke in the presence of alkali metallic compound, and then washing the activated coke.

(11) A process of making an activated carbon comprising steps of:

carbonizing pitch to obtain a graphitizable coke, mixing the graphitizable coke with 7000 ppm or more in metallic element concentration of chemical Z containing any of elements in the 2nd group, any of elements in the 3rd to 11th groups of the 4th period, or element in the 4th group of the 5th period on periodic table to obtain a mixture, activating the mixture in the presence of alkali metallic compound, and then
washing the activated mixture.

(12) The process of making an activated carbon according to (10) or (11), in which the graphitizable coke has true density of 1.44 g/cm$^3$ to 1.52 g/cm$^3$.

(13) The process of making an activated carbon according to any one of (10) to (12), in which the pitch has softening point of 100° C. or less.

(14) The process of making an activated carbon according to any one of (10) to (13), in which the pitch comprises coal based pitch, petroleum based pitch, or organic solvent soluble constituent thereof.

(15) The process of making an activated carbon according to any one of (10) to (14), in which the chemical Z comprises simple substance or compound, containing at least one element selected from the group consisting of Ca, Ti, Mn, Fe, Co, Ni, Cu, and Zr.

(16) The process of making an activated carbon according to any one of (10) to (15), in which the chemical Z comprises simple substance or at least one compound selected from the group consisting of oxide, hydroxide, chloride, bromide, iodide, fluoride, phosphate, carbonate, sulfide, sulfate and nitrate.

(17) The process of making an activated carbon according to any one of (10) to (16), in which the alkali metallic compound comprises alkali metallic hydroxide.

(18) The process of making an activated carbon according to any one of (10) to (17), in which the alkali metallic compound comprises a compound containing at least one element selected from the group consisting of K, Na and Cs.

(19) A carbon composite powder comprising the activated carbon according to any one of (1) to (9), and a carbon fiber.

(20) The carbon composite powder according to (19), in which the carbon fiber has pore therein, a specific surface area of 10 m$^2$/g to 50 m$^2$/g, an average diameter of fiber of 50 nm to 500 nm, and an aspect ratio of 5 to 1000.

(21) A polarizable electrode comprising the activated carbon according to any one of (1) to (9), carbon black, and binder.

(22) A polarizable electrode comprising the activated carbon according to any one of (1) to (9), carbon fiber, carbon black, and binder.

(23) The polarizable electrode according to (22), in which the amount of the carbon fiber is 0.1% by mass to 20% by mass to that of the activated carbon.

(24) The polarizable electrode according to (22) or (23), in which the carbon fiber has pore therein, a specific surface area of 10 m$^2$/g to 50 m$^2$/g, an average diameter of fiber of 50 nm to 500 nm, and an aspect ratio of 5 to 1000.

(25) The polarizable electrode according to any one of (21) to (24), in which the binder comprises at least one polymer selected from the group consisting of polytetrafluoroethylene, polyvinylidenefluoride, rubber comprising acrylate monomer unit, and rubber comprising butadiene monomer unit.

(26) An electric double layer capacitor comprising the polarizable electrode according to any one of (21) to (25).

(27) The electric double layer capacitor according to (26), comprising electrolytic solution dissolved at least one electrolytic salt selected from the group consisting of quaternary ammonium salt, quaternary imidazolium salt, quaternary pyridinium salt, and quaternary phosphonium salt into organic solvent, in which electrolytic cation is 3 Å to 15 Å in an ion size, and electrolytic anion is 5 Å to 10 Å in an ion size.

(28) A slurry comprising the activated carbon according to any one of (1) to (9).

(29) A paste comprising the activated carbon according to any one of (1) to (9).

(30) An electrode sheet, in which the activated carbon according to any one of (1) to (9) is applied onto the surface thereof.

(31) A power supply system comprising the electric double layer capacitor according to (26) or (27).

(32) A vehicle in which the electric double layer capacitor according to (26) or (27) is employed.

(33) A railroad in which the electric double layer capacitor according to (26) or (27) is employed.

(34) A ship in which the electric double layer capacitor according to (26) or (27) is employed.

(35) An aircraft in which the electric double layer capacitor according to (26) or (27) is employed.

(36) A portable apparatus in which the electric double layer capacitor according to (26) or (27) is employed.

(37) An apparatus for office work in which the electric double layer capacitor according to (26) or (27) is employed.

(38) A solar power generation system in which the electric double layer capacitor according to (26) or (27) is employed.

(39) A wind power generation system in which the electric double layer capacitor according to (26) or (27) is employed.

(40) A communication apparatus in which the electric double layer capacitor according to (26) or (27) is employed.

(41) An electronic tag in which the electric double layer capacitor according to (26) or (27) is employed.

(42) An adsorbent comprising the activated carbon according to any one of (1) to (9).

(43) The adsorbent according to (42), which is for hydrocarbon gas having 1 to 4 of carbon atoms.

(44) A preventing device from evaporating gasoline, in which the adsorbent according to (42) or (43) is employed.

(45) A stock tank for natural gas, in which the adsorbent according to (42) or (43) is employed.

(46) A natural gas automobile, in which the adsorbent according to (42) or (43) is employed.

The activated carbon in the invention can largely adsorb hydrocarbon gas such as methane under low relative pressure, regardless of low specific surface area, which causes to be good packing property in a storage tank to downsize a plant. So the activated carbon in the invention is favorable adsorbent for a storage unit of natural gas on a natural gas automobile, or a canister on a gasoline automobile etc.

The activated carbon in the invention has high electrolytic ion mobility at cryogenic temperatures, can raise activated carbon density in electrode regardless of low internal resistance at cryogenic temperatures. So the activated carbon in the invention is favorable for material of polarizable electrode of an electric double layer capacitor.

BRIEF DESCRIPTION OF DRAWINGS

FIG. 1: Section of cell for performance test of electric double layer capacitor

FIG. 2: Distribution curves of pore size of activated carbon obtained in Example 1 and Comparative examples 1 to 3

FIG. 3: Distribution curves of pore size of activated carbon obtained in Examples 5 to 7 and Comparative example 4

FIG. 4: Distribution curves of pore size of activated carbon obtained in Examples 8 to 10 and Comparative examples 5 to 6

EXPLANATION OF SYMBOL curve K: pore size distribution of activated carbon obtained in Example 1;

curve L: pore size distribution of activated carbon obtained in Example 2;

curve M: pore size distribution of activated carbon obtained in Example 3;

curve N: pore size distribution of activated carbon obtained in Comparative Example 1;

curve O: pore size distribution of activated carbon obtained in Comparative Example 2;

1: lid;
2: O-ring;
3: current collector;
4: insulator;
5: vessel;
6: plate spring;
7: electrode;
8: separator;
a: peak a;
b: peak b;
c: peak c;
d: peak d

BEST MODE FOR CARRYING OUT THE INVENTION

[Activated Carbon]

An activated carbon in the invention has the highest peak D within the range of 1.0 nm to 1.5 nm, preferably 1.2 nm to 1.4 nm, in pore size distribution as calculated by BJH method from $N_2$-adsorption isotherm at 77.4 K.

Pore size distribution of an activated carbon can be calculated by BJH method from $N_2$-adsorption isotherm at 77.4 K. Concretely, activated carbon is cooled down to 77.4 K (boiling point of nitrogen), nitrogen gas is introduced, and adsorption quantity of nitrogen gas V [cc/g] is measured by volume method. The measurement values are plotted onto x-axis of ratio ($P/P_0$) of equilibrium adsorption pressure of nitrogen gas P [mmHg] and saturated vapor pressure of nitrogen gas $P_0$ [mmHg], and y-axis of adsorption quantity of nitrogen gas V [cc/g] to make $N_2$-adsorption isotherm. Pore size distribution analysis is carried out by BJH (Barrett-joyner-Halenda) method from the $N_2$-adsorption isotherm. BJH method, which is well known in the art, for instance, may be carried out by the method as described in J. Amer. Chem. Soc. 73., 373.(1951).

The pore size distribution analysis can give pore size distribution curve on x-axis of pore diameter and y-axis of pore volume, as shown in FIG. 2 to 4. FIG. 2 to 4 are distribution curves of pore size of activated carbon obtained in the subsequent Examples.

The activated carbon in the invention has the highest Peak D of 0.012 to 0.05 cm³/g, preferably 0.02 to 0.035 cm³/g. The peak D of less than 0.012 cm³/g causes to lower an electrolytic ion mobility inside pore when viscosity of electrolytic solution rises at cryogenic temperatures, lowering charge and discharge property and elevating internal resistance property at cryogenic temperatures. Also, adsorption quantity of methane gas likely decreases. The peak D of more than 0.05 cm³/g causes to lower activated carbon density in electrode, lowering an electric capacity per volume [F/cm³]. Also, filling density of activated carbon in storage vessel is apt to diminish, though gas adsorption quantity increases.

The preferable activated carbon has any one of a peak C within the range of 1.5 to 1.7 nm in a pore diameter, a peak B within the range of 1.7 to 2.0 nm in a pore diameter, and a peak A within the range of 2.0 to 2.5 nm in a pore diameter. In FIG. 4, pore size distribution shown by curve M (Example 10) has peak D at approximately 1.22 nm in a pore diameter, peak C at approximately 1.54 nm in a pore diameter, peak B at approximately 1.85 nm in a pore diameter, and peak A at approximately 2.28 nm in a pore diameter. Pore size distribution shown by curve L (Example 9) has peak D, peak C, and peak B. Pore size distribution shown by curve K (Example 8) has peak D and peak C.

The activated carbon in the invention has the peak D of 2 to 32%, preferably 20 to 31% to total pore volume. The peak D falling within the range results enlarging adsorption quantity of hydrocarbon gas such as methane.

An activated carbon in the invention, under pore size distribution as calculated by BJH method from $N_2$-adsorption isotherm at 77.4 K, has a peak a within the range of 2.1 to 2.4 nm in a pore diameter, a peak b within the range of 1.7 to 2.1 nm in a pore diameter, a peak c within the range of 1.4 to 1.7 nm in a pore diameter, and a peak d within the range of 1.1 to 1.4 nm in a pore diameter, and has area d of 3.7 to 4.8, area c of 1.6 to 2.3 and area b of 1.6 to 2.1, supposing that area a is 1, in which the area a, the area b, the area c, and the area d are each enclosed with pore diameter axis and distribution curve of each peak within the above pore diameter range.

An activated carbon in the invention, under pore size distribution as calculated by BJH method from $N_2$-adsorption isotherm at 77.4 K, has a peak a within the range of 2.1 to 2.4 nm in a pore diameter, a peak b within the range of 1.7 to 2.1 nm in a pore diameter, a peak c within the range of 1.4 to 1.7 nm in a pore diameter, a peak d within the range of 1.1 to 1.4 nm in a pore diameter, a peak e within the range of 0.8 to 1.1 nm in a pore diameter, and a peak f within the range of 0.4 to 0.8 nm in a pore diameter, and has area f of 2.2 to 2.5, area e of 2.3 to 2.5, area d of 4.6 to 4.8, area c of 2.1 to 2.3 and area b of 1.9 to 2.1, supposing that area a is 1, in which the area a, the area b, the area c, the area d, the area e, and the area f are each enclosed with pore diameter axis and distribution curve of each peak within the above pore diameter range.

An activated carbon in the invention has a specific surface area as measured by BET method on $N_2$-adsorption of preferably 1100 to 2200 m²/g, more preferably 1500 to 2200 m²/g, particularly preferably 1800 to 2100 m²/g.

BET specific surface area of activated carbon is so small that total pore volume is lowered, falling down electrolytic ion mobility at cryogenic temperatures, degrading property of charge and discharge. Also adsorption quantity of gas such as methane tends to decrease.

BET specific surface area of activated carbon is so large that electrode density is lowered, decreasing an electric capacity per volume (F/cm³) for an electric double layer capacitor. Also, filling density in storage vessel is lowered to tend toward gas storage lower than asked for adsorbent.

Ratio of BET specific surface area [m²/g] and pore volume of peak D [cm³/g] falls within the range of preferably 500,000:1 to 800,000:1.

An activated carbon in the invention preferably has tapping density (number of tapping is 50) of 0.35 to 0.7 g/cm³, and powder resistance at 1 MPa of no more than 0.4 Ωcm. Tapping density can be measured with tapping density measure (made by KURAMOCHI KAGAKU KIKAI SEISAKUSHO Co.)

[Process of Making Activated Carbon]

A process of making an activated carbon in the invention is not particularly limited. Mentioned as the preferable process are process (A) of making an activated carbon comprising steps of carbonizing pitch in the presence of 7000 ppm or more in metallic element concentration of chemical Z containing any of elements in the 2nd group, any of elements in the 3rd to 11th groups of the 4th period, or element in the 4th group of the 5th period on periodic table to obtain a graphitizable coke, activating the graphitizable coke in the presence of alkali metallic compound, and then washing the activated coke, and process (B) of making an activated carbon comprising steps of carbonizing pitch to obtain a graphitizable coke, mixing the graphitizable coke with 7000 ppm or more in metallic element concentration of chemical Z containing any of elements in the 2nd group, any of elements in the 3rd to 11th groups of the 4th period, or element in the 4th group of the 5th period on periodic table to obtain mixture, activating the mixture in the presence of alkali metallic compound, and then washing the activated mixture.

An electric property of activated carbon is sensitively influenced by structural property thereof such as specific surface area, pore size distribution, crystalline structure. The structural property of activated carbon is decided by structure of raw material, condition of carbonization, condition of activation and the like. Thus structure of raw material, condition of carbonization, condition of activation and the like need to be optimized in order to obtain a useful activated carbon for electrode material.

It is proper that pitch used in the process of making an activated carbon in the invention has a low softening point. In the pitch, there are petroleum based pitch, coal based pitch, organic solvent soluble constituent thereof and so on. In the invention, organic solvent soluble constituent of petroleum based pitch or that of coal based pitch is particularly preferably used. The constituent has less side chain, and higher content of aromatic compound that mingles polycyclic aromatic compounds having various molecular structure than a hardly graphitizable carbon material. It is considered that an activated carbon made from the constituent has formation of various complicated micro-crystalline structure coming from polycyclic aromatic compounds, which causes a good electric property and a good gas adsorption property. The pitch used in the invention is preferably not more than 100° C., more preferably 60 to 90° C. in a softening point.

A chemical Z used in the process in the invention contains any of elements in the 2nd group that is alkaline earth metallic element such as Be, Mg, Ca, Sr, Ba and Ra, any of elements in the 3rd to 11th groups of the 4th period that is Sc, Ti, V, Cr, Mn, Fe, Co, Ni and Cu, or element in the 4th group of the 5th period that is Zr, on periodic table.

As the chemical Z may be used any of simple substance, inorganic compound, and organic compound. Exampled as inorganic compound are oxide, hydroxide, chloride, bromide, iodide, fluoride, phosphate, carbonate, sulfide, sulfate and nitrate. As organic compound is mentioned organometallic complex, with ligand as acetylacetone, cyclopentadien, such as tetraalkoxytitanium, acetylacetonetributoxyzirconium.

Compound containing at least one element selected from the group consisting of Ca, Ti, Mn, Fe, Co, Ni, Cu, and Zr is preferable as the chemical Z. There are materially mentioned calcium oxide, titanium oxide, iron oxide, nickel oxide, and zirconium oxide. These chemical Z may be used alone or in combination with two or more.

[Process (A) of Making Activated Carbon]

In a process (A) of making an activated carbon in the invention, first of all, pitch is carbonized in the presence of the chemical Z to obtain a graphitizable coke. Specifically, the pitch and the chemical Z are mixed, and the mixture may be heated. The manner for mixing of the pitch and the chemical Z is not particularly limited if they can be uniformly mixed. For instance, at room temperature, powder of chemical Z is added into pitch powder, and is stirred to obtain mixture. Mentioned as the manner for stirring are V-shaped Mixer, Henschel mixer, Nowter mixer and the like. Using of these manner for mixing may result obtaining the uniform mixture.

The chemical Z is used 7000 ppm or more, preferably 10000 ppm or more in metallic element concentration. In case of less than 7000 ppm, it does not enough work as catalyst for the activation step. Metallic element concentration (ppm) is the value as calculated by the following formula:

[mass of metallic element in chemical Z]/([mass of pitch having softening point]+[mass of chemical Z])×$10^6$ The manner for carbonizing is not particularly limited, to start with, first carbonization step is carried out within the range of 400 to 700° C., preferably 450 to 550° C. in temperature, and then, second carbonization step is carried out within the range of 500 to 700° C., preferably 540 to 670° C. in temperature. Temperature in the second carbonization step is usually higher than that in the first carbonization step.

The carbonization leads pyrolysis reaction into pitch. The pyrolysis reaction causes to desorb gas and light fraction from the pitch, polycondensing residue thereof to obtain solid finally. The carbonization step almost decides micro-bounding state between carbon atoms. The decided crystalline structure of coke in the step determines foundation of structure of resultant activated carbon.

Temperature of less than 400° C. in first carbonization step unlikely causes enough pyrolysis reaction and carbonization. Temperature of more than 700° C. is tend to make a surfeit of graphite like micro-crystalline structure parts, and to be difficult for activation with alkaline compound.

The first carbonization step is preferably 3 to 10° C./hr, more preferably 4 to 6° C./hr in a heating rate, and preferably 5 to 20 hours, more preferably 8 to 12 hours in period of holding at maximum temperature.

Temperature of less than 500° C. in the second carbonization step is not apt to cause working enough the second carbonization step. Temperature of more than 700° C. in the second carbonization step is tend to make a surfeit of graphite like micro-crystalline structure parts, and to be difficult for activation with alkaline compound.

The second carbonization step is preferably 3 to 100° C./hr, more preferably 4 to 60° C./hr in a heating rate, and preferably 0.1 to 8 hours, more preferably 0.5 to 5 hours in period of holding at maximum temperature. In the second carbonization step, high heating rate, short period of holding at maximum temperature, and low cooling rate may allow to provide the activated carbon in the invention. It is preferable to take 5 to 170 hours to lower the temperature from maximum temperature to room temperature.

The graphitizable coke obtained by the above carbonization step is to have true density of preferably 1.44 to 1.52 g/cm$^3$, more preferably 1.45 to 1.52 g/cm$^3$. The true density falling within the range may allow to provide the activated carbon in the invention easily. A true density is measured by liquid-phase substitution method (picno meter method).

It is preferable that the graphitizable coke obtained by the above carbonization step is milled into an average particle diameter of 1 to 30 μm before the following activation with alkali metallic compound. The manner for milling is not particularly limited. Mentioned as well known milling apparatus are jet mill, vibration mill, Balberizer, and the like. If the graphitizable coke without milling at that is activated, metallic contamination in particle can not be sometimes enough removed from the resultant activated carbon. The remain of metallic contamination likely causes to cut down a life of the adsorbent.

In the process (A) of making an activated carbon, afterward, the obtained graphitizable coke is activated in the presence of alkali metallic compound. Specifically, the graphitizable coke is mixed with alkali metallic compound, and the mixture is heated.

Alkali metallic compound used in the process for making an activated carbon in the invention is not particularly limited. Alkali metallic hydroxide such as sodium hydroxide, potassium hydroxide, cesium hydroxide is preferable as alkali metallic compound. Alkali metallic compound is used preferably 1.5 to 5 times, more preferably 1.7 to 3 times as heavy as the coke.

An activating temperature is usually 600 to 800° C., preferably 700 to 760° C. An activation is usually carried out in atmosphere of inert gas. As inert gas are mentioned nitrogen gas, argon gas and the like. Also, water vapor, carbon dioxide and so on, if needs be, may be introduced during activation.

In the activation, for instance, when potassium hydroxide is used, potassium hydroxide is molten and dehydrated at 300 to 400° C. Activation reaction occurs with potassium metal and water vapor at 400° C. or more.

At this point, the reactant changes from liquid state into solid state, gas such as carbon monoxide (CO), carbon dioxide ($CO_2$), and hydrogen ($H_2$) simultaneously generates from the reactant by oxidation of carbon. The generation of gas invites sparkle or bumping in reactant, boiling over reactant, which requires volume of vessel enough larger than that of the reactant. The composition of graphitizable coke and carbon fiber can restrain the sparkle or bumping.

In the process in the invention, alkali metal obtained by reduction reaction of alkali metallic compound enters and opens between carbon layers of the graphitizable coke to make many spaces.

We guess that an electrolytic ion (salvation ion: 3.7 Å in radius) is intercalated between carbon layers of 3.35 to 4 Å in space at time of applying voltage to the capacitor, is adsorbed onto the pore surface to spread the space between the carbon layers, whereby the electric capacity grows higher.

In the conventional activation with alkali metal, using of carbon by reaction with water or carbon dioxide results making pore, space between carbon layers made by alkali metal is small. As the result, there is few conventional capacitor having high electric capacity.

In the process in the invention, the activation can be carried out in the presence of alkali metal vapor. The alkali metal vapor can be used instead of solid alkali metallic compound or together solid alkali metallic compound, since the intercalation of alkali metal between carbon layers makes pore.

In the process (A) in the invention, finally, the activated coke is washed with water, acids or so on.

As the acid used in the acid-washing are mentioned inorganic acids such as sulfuric acid, phosphoric acid, hydrochloric acid, and nitric acid, and organic acid such as formic acid, acetic acid, and citric acid. In the view of washing efficiency and removability, hydrochloric acid or citric acid is preferable. Concentration of acid is preferably 0.01 to 20 normality, more preferably 0.1 to 1 normality.

In a manner for washing, acid may be added to and mixed with the coke. Boiling or heating at 50 to 90° C. is preferable for improvement of washing efficiency. Also use of ultrasonic wave washer is effective. Washing time is usually 0.5 to 24 hours, preferably 1 to 5 hours.

Number of washing operation depends on the manner for washing. For example, 1 to 5 boiled-acid-washing operations and then 1 to 5 heated-water-washing operations are preferable for removal of residual chloride. A vessel made from material such as glass lining, tantalum, and TEFLON (registered trade mark) is preferably used in the acid-washing operation.

In the washing step, full automatic mixing and heating filter dryer such as multi function filter (WD Filter provided by NISSEN Co. Ltd.) and FV dryer (provided by OKAWARA MFG. Co. Ltd.) may be used. Pure water used for washing has ionic electric conductivity of no more than 1.0 μS/cm. A waste fluid from washing step may be reused as a part of washing water by recycling.

[Process (B) of Making Activated Carbon]

In the other process (B) for making the activated carbon in the invention, first of all, pitch is carbonized to obtain a graphitizable coke. The manner for carbonizing is the same as that described in the above process (A), except the chemicals Z such as alkaline earth metallic compound is absent in the step of carbonization.

The graphitizable coke obtained by the above carbonization is adjusted to a true density to preferably 1.4 to 1.6 g/cm$^3$, more preferably 1.44 to 1.52 g/cm$^3$, especially preferably 1.45 to 1.52 g/cm$^3$. This range of a true density easily results obtaining the activated carbon in the invention. The true density is the value as measured by liquid-phase substitution method (picno meter method).

Then, 7000 ppm or more, preferably 10000 ppm or more in metallic element concentration of chemicals Z is mixed with the graphitizable coke obtained by the above carbonization, the mixture is activated in the presence of alkali metallic compound. Specifically, the graphitizable coke, alkali metallic compound and the chemicals Z may be mixed and heated. The manner for the activation is the similar to that described in the above process (A). The metallic element concentration is the value calculated by the following formula:

$$[\text{mass of metallic element in chemical Z}]/([\text{mass of coke}]+[\text{mass of chemical Z}])\times 10^6$$

Finally, the coke activated by the above step is washed. The manner for washing is the same as that described in the above process (A).

The alkali activation, of the graphitizable coke obtained by the carbonization of pitch in the presence of the chemicals Z, or of the mixture that the coke obtained by carbonization of pitch is mixed with the chemicals Z, can easily results obtaining the activated carbon in the invention.

The activated carbon obtained by these process shows high electric capacity in the first cycle of charge and discharge without an excess voltage, and has large retention rate of the electric capacity.

The enough carbonization of the graphitizable coke decreases the amount of functional group on the surface of carbon to restrain the electric capacity from degradation.

[Carbon Composite Powder]

A carbon composite powder in the invention comprises the activated carbon in the invention and a carbon fiber. The carbon composite powder is obtained by compounding the carbon fiber with the activated carbon. The manner for compounding is not particularly limited. It is preferable that the mixture of the carbon fiber and the graphitizable coke is activated to obtain the carbon composite powder comprising the carbon fiber and the activated carbon. This manner decreases a contact resistance between the particles, increases an electric conductivity and a mechanical strength of electrode, and lowers a dilatation rate of the electrode at the time of applying voltage. Also, the carbon composite powder may be produced by simply mixing the carbon fiber with the activated carbon. The carbon composite powder has larger thermal conductivity than the activated carbon alone has.

The carbon fiber used in the invention may be produced by, for example, spraying benzene and metallic catalyst particle into current of hydrogen gas at approximately 1000° C. A graphitized carbon fiber may be employed, in which the carbon fiber obtained by the spray method or the like is burned at 1000 to 1500° C. and then is further burned at 2500° C. or more to obtain the graphitized carbon fiber.

The carbon fiber preferably has pore therein, a specific surface area of 10 to 50 $m^2/g$, an average diameter of fiber of 50 to 500 nm, and an aspect ratio of 5 to 1000. Any carbon fiber such as a linear carbon fiber, a branched carbon fiber or mixture thereof may be employed.

The preferable fiber length of carbon fiber is 0.5 to 2 times as long as average diameter of the activated carbon. When carbon fiber length is 0.5 time shorter, crosslinking of carbon fiber between the activated carbon particles is not made, being likely insufficient in an electric conductivity. When carbon fiber length is 2 times longer, carbon fiber unlikely interposes between activated carbon particles, likely lowering a mechanical strength of polarizable electrode.

A carbon fiber treated by activation such as gas activation (water vapor, carbon dioxide and so on), chemical activation (zinc chloride, phosphoric acid, calcium carbonate and so on), alkaline activation (potassium hydroxide, sodium hydroxide, and so on) can be employed, as the carbon fiber has a concentric circular orientation structure. In this situation, the carbon fiber having a controlled surface structure which has a micro pore diameter of 2 nm or less, a micro pore volume of 0.01 to 0.4 $cm^3/g$, and BET specific surface area of 10 to 500 $m^2/g$ is preferable. The micro pore volume is so large that ion diffusion resistance in the electrode may unfavorably rise.

The amount of the carbon fiber is preferably 0.02 to 20% by mass, more preferably 0.1 to 20% by mass, particularly preferably 0.5 to 10% by mass, based on the activated carbon. The carbon fiber of less than 0.02% by mass works only a little gain in thermal conductivity of carbon composite powder mixed with graphitizable coke, which causes insufficient thermal uniformity at the time of activation to be difficult for equitable activation, being unlikely to produce the good quality activated carbon having a large electric capacity per volume ($F/cm^3$) industrially and stably. The carbon fiber of more than 20% by mass decreases density of electrode, and likely lowers an electric capacity per volume ($F/cm^3$).

The carbon fiber having good thermal and electric conductivity enhances heat radiation, and reinforces function as buffer for dilatation of electrode by mixing the activated carbon particle therewith, which effectively works to prevent from increasing dilatation of electrode at the time of applying voltage.

The activated carbon in the invention may be employed in polarizable electrode and electric double layer capacitor.

[Polarizable Electrode and Electric Double Layer Capacitor, and Use Thereof]

A polarizable electrode in the invention comprises the activated carbon in the invention, carbon black, and binder, preferably further comprises the carbon fiber.

The carbon black used in the polarizable electrode in the invention may be carbon material known as electric conductor for an electrode of an electrochemical element. There are mentioned acetylene black, channel black, furnace black and so on. The amount of the carbon black is usually 0.1 to 20 parts by mass, preferably 0.5 to 10 parts by mass, based on polarizable electrode 100 parts by mass.

The carbon fiber used in the polarizable electrode in the invention is the same as the above described. The manner for putting the carbon fiber into the polarizable electrode is not only mixing of the carbon fiber, the activated carbon, the carbon black, and binder, but also compounding of the above carbon composite powder, the carbon black and the binder.

The polarizable electrode may be usually produced by rolling a compound comprising the activated carbon, an electric conductor, and the binder; by coating a paste or a slurry comprising the activated carbon, the electric conductor, binder, and optionally solvent, onto a collector; and by burning the mixture comprising the activated carbon and un-carbonized resins.

For example, to the activated carbon powder in the invention having average diameter of 1 to 50 μm are added the carbon black as electric conductor, and the binder such as polytetrafluoroethylene (PTFE), polyvinylidenefluoride, rubber comprising acrylate monomer unit, and rubber comprising butadiene monomer unit, to be dry-mixed by blender. To the powder mixture is poured an organic solvent having a boiling point of 200° C. or less, and the powder mixture is swelled. The swelled mixture is formed into sheet having thickness of approximately 0.1 to 0.5 mm, which is dried under reduced pressure at approximately 100 to 200° C. to be able to obtain the polarizable electrode.

The organic solvent is not limited as long as the organic solvent has a boiling point of 200° C. or less, such as hydrocarbons as toluene, xylene, and benzene; ketones as acetone, methylethylketone, and butylmethylketone; alcohols as methanol, ethanol, and butanol; and esters as ethylacetate, and butylacetate. The preferable organic solvent is toluene, acetone, ethanol or the like. Use of an organic solvent having a boiling point of more than 200° C. is not preferable, because of remaining the organic solvent in a sheet in the drying at 100 to 200° C. after forming the sheet.

The sheet is stamped, and a metallic plate as a collector is laminated onto the stamped sheet to obtain an electrode. Two electrodes are lapped in the state that a separator is interposed between the electrodes and the metallic plate is outside, which are steeped in electrolyte to be able to obtain an electric double layer capacitor.

Any of non-aqueous electrolytic solution and aqueous electrolytic solution known in the prior art may be employed as the electrolyte in the electric double layer capacitor. Also high-molecular solid electrolyte being non-aqueous electrolyte, polymer gel electrolyte, and ionic liquid may be further employed as the other electrolyte.

As the aqueous electrolytic solution are mentioned sulfuric acid aqueous solution, sodium sulfate aqueous solution, sodium hydroxide aqueous solution and the like.

As non-aqueous electrolytic solution is mentioned an electrolytic solution comprising: quaternary ammonium salt or quaternary phosphonium salt used as electrolyte comprising cation represented by $R^1R^2R^3R^4N^+$ or $R^1R^2R^3R^4P^+$ and anion such as $BF_4^-$, $PF_6^-$, and $ClO_4^-$; and non-aqueous carbonate solvent such as ethylene carbonate, and propylene carbonate used as solvent. The electrolyte and solvent may be respectively used alone or in combination with two or more.

The separator optionally interposed between the electrodes may be ionic permeable porous separator. For example, micro-pore polyethylene film, micro-pore polypropylene film, polyethylene non woven fabric, polypropylene non-woven fabric, non-woven fabric mixed with glass fiber, and the like may be preferably used.

The electric double layer capacitor in the invention may be any of coin type capacitor which a pair of electrode sheets in the state that a separator is interposed between the electrode sheets is put in a metallic case with electrolyte, reel type capacitor which a pair of positive and negative electrodes in the state that a separator is interposed between the electrodes is rolled up, laminate type capacitor which a lot of electrode sheets in the state that a separator is respectively interposed between the electrode sheets are piled, and the like.

The electric double layer capacitor in the invention can be applied to power supply system. The power supply system is applied to a power supply system for car such as automobile and railroad; a power supply system for ship; a power supply system for aircraft; a power supply system for mobile electronic equipment such as cellular phone, mobile information terminal, and mobile electronic calculator; a power supply system for office work; a power supply system for a power generation system such as solar battery power generation system, and wind power generation system; and the like. Besides the electric double layer capacitor in the invention may be applied to a communication apparatus, and an electronic tag such as IC tag. The electronic tag comprises a transmitter, a radio receiver, a memory and a power source, when the radio receiver receives a set radio wave, the transmitter sends a set signal in the memory. The electric double layer capacitor can be employed as the power source for the electronic tag.

[Adsorbent]

The activated carbon in the invention can be employed as adsorbent. Specifically, the activated carbon can be preferably employed as gas adsorbent.

There are mentioned as gas adsorbable by the adsorbent in the invention hydrocarbon gas having 1 to 4 of carbons such as methane, ethane, ethylene, acetylene, propane, and butane; hydrogen, natural gas or town gas, liquefied petroleum gas, dimethylether, carbon dioxide, hydrogen sulfide, oxygen, nitrogen, nitrogen oxides (NOx), sulfur oxides (SOx), carbon monoxide, ammonia, and mixed gas thereof. As vapor adsorbable by the adsorbent are mentioned methanol, ethanol, water, chloroform, aldehydes, low molecular weight hydrocarbons, and the like. In these, for hydrocarbon gas having 1 to 4 of carbons, preferably gas mainly containing natural gas, the adsorbent in the invention has so good adsorption ability that the adsorbent in the invention may be favorably used for natural gas.

For adsorbing of gas such as natural gas by the adsorbent in the invention, the adsorbent is filled in sealed vessel such as gas cylinder and tank, the gas may be introduced into the vessel to be adsorbed. The adsorbed gas may be desorbed from the adsorbent to be consumed. The condition of adsorption and desorption is not particularly limited, temperature of the gas or the sealed vessel of no more than phase change point (usually melting point) of phase changeable substance is preferable. This using of the activated carbon in the invention may produce a natural gas store tank. The activated carbon in the invention is so excellent in packing ability in a tank and the like that the natural gas store tank can be downsized as against a conventional tank having the same adsorption property. Therefore, the activated carbon in the invention is favorable for a fuel tank of a natural gas automobile.

Use of the adsorbent in the invention can produce a preventing device from evaporating gasoline (a canister). In the view of conservation of global environment, various provisions against pollution are carried out on operation of automobile. There is system as one of the provisions that fuel vapor which evaporates in fuel tank, float room of evaporator, fuel store room and the like is adsorbed into the adsorbent in the canister at the time of stop, and air is introduced into the canister to desorb the fuel vapor from the adsorbent, sending the fuel vapor to an inlet tube of engine to burn it at the time of run. The activated carbon in the invention is favorable for the canister as the adsorbent, as the activated carbon has an excellent adsorption ability.

The activated carbon in the invention may be applied to other various uses such as freshness preservation or ripeness adjustment of crops as vegetable, fruit and flower by elimination of ethylene gas; humidity adjustment for magnetic disc device by elimination of water vapor; and prevention or treatment for sick-house syndrome or the like by elimination of volatile organic compound (hereafter, VOC) which evaporates from adhesive or resin used in building materials or interior decorations. The activated carbon or adsorbent in the invention for various uses may be attached to or put into resin sheet, paper, non-woven fabric or the like, or may be kneaded in resin.

The following examples and comparative examples are shown to explain the invention in the concrete. The invention is not limited by these examples.

Measurement of each property and producing of electrode and electric double layer capacitor in the examples are described as the following:

[Measurement of Bet Specific Surface Area and Pore Size Distribution]

BET specific surface area and pore size distribution were determined by BET method and BJH method grounded on nitrogen adsorption isotherm at temperature of liquid nitrogen (77.4 K) as measured with NOVA 1200 produced by QUANTACHROME Instruments.

[Producing of Electrode]

Into 80 parts by mass of activated carbon having an average diameter of 10 μm were added 10 parts by mass of polytetrafluoroethylene (PTFE) and 10 parts by mass of carbon black, which were kneaded and rolled to obtain a sheet having thickness of 0.5 mm. The sheet was stamped into disk having diameter of 20 mm, and the disk was dried around the clock to obtain polarizable electrode.

[Assembling of Electric Double Layer Capacitor]

The above polarizable electrode was employed to assemble a cell for evaluation (hereafter, test cell) as shown in FIG. 1 inside a glove box in the presence of circulated high purity argon.

In FIG. 1, 1 is lid made from aluminum, 2 is O-ring made from fluororubber, 3 is collector comprising aluminum, 4 is insulator comprising TEFLON (registered trade mark), 5 is vessel made from aluminum, 6 is plate spring made from aluminum, 7 is polarizable electrode, and 8 is separator having thickness of 1 mm comprising glass fiber.

There was employed the electrolytic solution produced by TOMIYAMA PURE CHEMICAL INDUSTRIES. Inc. comprising propylene carbonate (PC) as solvent and 1 mol/l of $(CH_3)(C_2H_5)_3NBF_4$, $(C_2H_5)_4NBF_4$ as electrolyte, or comprising ethylene carbonate/di-ethylene carbonate (EC/DEC) as solvent and 1 mol/l of $LiBF_4$, $LiPF_6$ as electrolyte.

[Measurement of Charge and Discharge Property]

Charge and discharge operation between 0 V and 2.7 V at 5 mA was carried out by charge and discharge measuring system HJ-101SM6 produced by HOKUTO DENKO Co. An electrostatic capacity per mass (F/g) and an electrostatic capacity per volume ($F/cm^3$) of activated carbon of both electrodes in an electric double layer capacitor were determined from discharge property curve in the 2nd constant current discharge operation.

[Permanence]

Two hundred charge and discharge cycle operations were carried out. A retention rate of the electric capacity was determined to evaluate the permanence. The retention rate is measured from quotient of an electric capacity after 200th charge and discharge cycle operation by an electric capacity after 2nd charge and discharge cycle operation.

EXAMPLE 1

Coal pitch having softening point of 86° C. was carbonized by first step at 560° C. (heating rate of 5° C./hr, holding period of 10 hours at 560° C.), and by second step at 630° C. (heating rate of 50° C./hr, holding period of 1 hour at 630° C.), which was milled to obtain a graphitizable coke. With 1000 g of the coke having an average diameter of 3.5 μm after milling were mixed 25 g of calcium carbonate powder with Henschel Mixer for 60 seconds to obtain a carbon powder. Potassium hydroxide powder 2.8 times as the carbon powder in mass were mixed with the carbon powder in ball mill, and the mixture was filled into a container being 300 mm in length, 300 mm in width, 3 mm in thickness and 10 mm in height, made from nickel. The container was heated in a batch type activation furnace (segmentation type furnace made by FUJI DEMPA KOGYO Co. Ltd.) under the heating rate of 5° C./min and holding period of 30 minutes at 400° C., and then heated at 720° C. as maximum temperature for 15 minutes, in the atmosphere of nitrogen. The container was cooled to 100° C. or less in the atmosphere of nitrogen, and then was taken out from the furnace into air. The reaction product was neutralized with 1N hydrochloride, and two boiled-acid washing operations with 0.1N hydrochloride were carried out to eliminate metallic impurity. And then two boiled-water washing operations were carried out to eliminate residual chlorine and metallic impurity. This was dried at 110° C. with hot air flow, and passed through filter having mesh of 330 and magnetic separator (magnetic power 12000 G) to obtain activated carbon having an average diameter of 4.6 μm.

The activated carbon was 2020 $m^2/g$ in a specific surface area, and 0.033 $cm^3/g$ in a pore volume designated as peak within 1.0 to 1.5 nm in a pore diameter. Into the activated carbon were dry-compounded 9% by mass of carbon black and 10% by mass of polytetrafluoroethylene (PTFE). Organic solvent was added to the compounded powder to swell it before kneading, the kneaded powder was rolled and dried under reduced pressure at 200° C. to produce an electrode material. A test cell with electrolytic solution of $(C_2H_5)_4NBF_4$/PC under 2.5 V charge and discharge at 25° C. had an electric capacity of 41.0 F/g and 23.8 F/ml, the test cell at cryogenic temperature of −30° C. had a capacity retention rate of 93%. Pore size distribution of the activated carbon was shown in FIG. 2.

EXAMPLE 2

An activated carbon was produced by the same manner as Example 1 except that 10 g of calcium hydroxide and 10 g of calcium oxide instead of calcium carbonate were mixed with 1000 g of the graphitizable coke having average diameter of 3 μm after milling similar to that in example 1 with Henschel mixer for 60 seconds.

The activated carbon was 1990 $m^2/g$ in a specific surface area, and 0.032 $cm^3/g$ in a pore volume designated as peak within 1.0 to 1.5 nm in a pore diameter. Into the activated carbon were dry-compounded 9% by mass of carbon black and 10% by mass of polytetrafluoroethylene (PTFE), organic solvent was added to the compounded powder to swell it before kneading, the kneaded powder was rolled and dried under reduced pressure at 200° C. to produce an electrode material. A test cell with electrolytic solution of $(CH_3)(C_2H_5)_3NBF_4$ under 2.7 V charge and discharge had an electric capacity of 44.5 F/g and 27.6 F/ml, the test cell at cryogenic temperature of −30° C. had a capacity retention rate of 90%.

EXAMPLE 3

Into coal pitch having softening point of 86° C. were added 3% by mass of calcium carbonate, which was carbonized by first step at 560° C. (heating rate of 5° C./hr, holding period of 10 hours at 560° C.), and by second step at 640° C. (heating rate of 50° C./hr, holding period of 1 hour at 640° C.), which was milled to obtain a graphitizable coke. Potassium hydroxide powder 3.0 times as the coke in mass were mixed with 1000 g of the coke which has an average diameter of 3.5 μm after milling in a ball mill, and the mixture was filled into a container being 600 mm in diameter, 3 mm in thickness and 1050 mm in height, made from nickel.

The container was heated in a continuous activation furnace (Roller hearth kiln made by NORITAKE Co. Ltd.) under the heating rate of 5° C./min, holding period of 30 minutes at 400° C., and heated at 740° C. as maximum temperature for 15 minutes, in the atmosphere of nitrogen. The container was cooled to 100° C. or less in the atmosphere of nitrogen, and then was taken out from the furnace into air. The reaction product was neutralized with 1N hydrochloride, and 4 boiled-acid washing operations with 0.1N hydrochloride were carried out to eliminate metallic impurity. And then 5 boiled-water washing operations were carried out to eliminate residual chlorine and metallic impurity. This was dried at 110° C. with hot air flow, and passed through filter having mesh of 330 and magnetic separator (magnetic power 12000 G) to obtain activated carbon having an average diameter of 4.5 μm.

The activated carbon was 2030 $m^2/g$ in a specific surface area, and 0.034 $cm^3/g$ in a pore volume designated as peak within 1.0 to 1.5 nm in a pore diameter. Into the activated carbon were dry-compounded 9% by mass of carbon black and 10% by mass of polytetrafluoroethylene (PTFE), organic solvent was added to the compounded powder to swell the powder before kneading, the kneaded powder was rolled and dried under reduced pressure at 200° C. to produce an electrode material. A test cell with electrolytic solution of $LiPF_6$/EC/DEC under 2.5 V charge and discharge had an electric capacity of 40.6 F/g and 23.6 F/ml, the test cell at cryogenic temperature of −30° C. had a capacity retention rate of 85%.

EXAMPLE 4

An activated carbon was produced by the same manner as Example 1 except that 20 g of magnesium oxide instead of calcium carbonate were mixed with 1000 g of the graphitizable coke having average diameter of 3 μm after milling similar to that in example 1 with Henschel mixer for 60 seconds.

The activated carbon was 1520 $m^2/g$ in a specific surface area, and 0.022 $cm^3/g$ in a pore volume designated as peak within 1.0 to 1.5 nm in a pore diameter. Into the activated carbon were dry-compounded 5% by mass of vapor grown carbon fiber (VGCF, produced by SHOWA DENKO K.K.), 4% by mass of carbon black and 10% by mass of polytetrafluoroethylene (PTFE), organic solvent was added to the compounded powder to swell the powder before kneading, the kneaded powder was rolled and dried under reduced pressure at 200° C. to produce an electrode material. Test cell with electrolytic solution of $(CH_3)(C_2H_5)_3NBF_4$/PC under 2.7 V charge and discharge had an electric capacity of 42.1 F/g and 26.9 F/ml, the test cell at cryogenic temperature of −30° C. had a capacity retention rate of 91%.

COMPARATIVE EXAMPLE 1

An activated carbon was produced by the same manner as Example 1 except that 3 g of calcium carbonate were mixed with 1000 g of the graphitizable coke having average diameter of 3 µm after milling similar to that in example 1 with Henschel mixer for 60 seconds.

The activated carbon was 2035 m$^2$/g in specific surface area. Into the activated carbon were dry-compounded 9% by mass of carbon black and 10% by mass of polytetrafluoroethylene (PTFE), organic solvent was added to the compounded powder to swell the powder before kneading, the kneaded powder was rolled and dried under reduced pressure at 200° C. to produce an electrode material. Test cell with electrolytic solution of $(CH_3)(C_2H_5)_3NBF_4$/PC under 2.7 V charge and discharge had an electric capacity at 25° C. of 41.7 F/g and 24.2 F/ml, the test cell at cryogenic temperature of −30° C. had a capacity retention rate of 62%. Pore size distribution of the activated carbon was shown in FIG. 2.

COMPARATIVE EXAMPLE 2

An activated carbon was produced by the same manner as Example 1 except that no alkaline earth compound were mixed with 1000 g of the graphitizable coke having average diameter of 3 µm after milling similar to that in example 1 with Henschel mixer for 60 seconds.

The activated carbon was 2036 m$^2$/g in a specific surface area. Into the activated carbon were dry-compounded 9% by mass of carbon black and 10% by mass of polytetrafluoroethylene (PTFE), organic solvent was added to the compounded powder to swell the powder before kneading, the kneaded powder was rolled and dried under reduced pressure at 200° C. to produce an electrode material. Test cell with electrolytic solution of $LiPF_6$/EC/DEC under 2.5 V charge and discharge had an electric capacity at 25° C. of 37.2 F/g and 22.7 F/ml, the test cell at cryogenic temperature of −30° C. had a capacity retention rate of 59%. Pore size distribution of the activated carbon was shown in FIG. 2.

COMPARATIVE EXAMPLE 3

A commercial activated carbon (MSP-20, produced by THE KANSAI COKE AND CHEMICALS Co. Ltd.) being alkaline activated carbon made of phenol based resin as raw material was used in the evaluation.

The activated carbon was 2210 m$^2$/g in a specific surface area. Into the activated carbon were compounded 9% by mass of carbon black and 10% by mass of polytetrafluoroethylene (PTFE), organic solvent was added to the compounded powder to swell the powder before kneading, the kneaded powder was rolled and dried under reduced pressure at 200° C. to produce an electrode material. Test cell with electrolytic solution of $(C_2H_5)_4NBF_4$/PC under 2.5V charge and discharge had an electric capacity at 25° C. of 39.2 F/g and 24.3 F/ml, the test cell at cryogenic temperature of −30° C. had a capacity retention rate of 61%. Pore size distribution of the activated carbon was shown in FIG. 2.

TABLE 1

| | mixing alkaline earth metallic comp. | alkaline earth metallic comp. [% by mass] | pore vol. of peak within 1.0 to 1.5 nm [cm$^3$/g] | retention rate at −30° C. [%] |
|---|---|---|---|---|
| Ex. 1 | with coke | $CaCO_3$ 2.5 | 0.033 | 93 |
| Ex. 2 | with coke | $Ca(OH)_2$ 1.0 CaO 1.0 | 0.032 | 90 |
| Ex. 3 | with pitch | $CaCO_3$ 3.0 | 0.034 | 85 |
| Ex. 4 | with coke | MgO 2.0 | 0.022 | 91 (VGCF addition) |
| Comp. Ex. 1 | with coke | $CaCO_3$ 0.3 | 0.014 | 62 |
| Comp. Ex. 2 | none (pitch based alkaline activated carbon) | none | 0.013 | 59 |
| Comp. Ex. 3 | none (phenol based alkaline activated carbon) | none | 0.013 | 61 |

As shown in TAB. 1, when a peak D within 0.1 to 1.5 nm in a pore diameter is regulated within the range of 0.020 to 0.035 cm$^3$/g, there can be produced the activated carbon having good charge and discharge property and low internal resistance under even cryogenic temperatures.

EXAMPLE 5

Coal based pitch was heated at 500° C. in the atmosphere of nitrogen to carry out the first carbonization step. The resultant was heated at 630° C. for 1 hour in the second carbonization step to obtain coke as raw material having a true density of 1.47 g/cm$^3$. The obtained coke was crushed into a diameter of 0.5 mm or less.

Into 71.5 mg of diiron trioxide as compound containing element in the 8th group of the 4th period were added 10 g of water to obtain iron oxide slurry. Into the iron oxide slurry were added 5.0 g of the above coke as raw material, and fully mixed to obtain mixed slurry of the coke as raw material and iron oxide. The resultant mixed slurry was dried at 110° C. over night to obtain compound of the coke and iron oxide.

Into vessel made from nickel and having diameter of 40 mm were charged 5 g of the compound of coke and iron oxide and 15.7 g of potassium hydroxide (95%), and the vessel put in a batch type furnace for activation reaction. Air in the furnace was displaced by nitrogen, and then temperature increase was begun. While the furnace was heated, nitrogen gas with a flow rate of 0.5 l/min was bubbled in water having temperature of 50° C. to be provided together saturated water vapor into the furnace.

In the activation reaction, the temperature in the furnace was increased to 400° C. at a rate of 6.3° C./min, held at 400° C. for 30 minutes, elevated to 720° C. at a rate of 5.3° C./min and maintained at 720° C. for 15 minutes. After the activation reaction, the furnace was cooled from 720° C. to room temperature for 2 hours.

The activated carbon taken out from the furnace was filtered, and washed to eliminate an alkaline ingredient. Boiled acid washing with 0.1 mol/l of hydrochloride at 100° C. dissolved and eliminated metallic impurity such as iron and nickel attached on the activated carbon. Then boiled water washing at 100° C., filtering and water washing were repeated in turn for the activated carbon to be 10 ppm or less of residual chlorine in the activated carbon, and the purified activated carbon was dried at 110° C. over night.

The obtained activated carbon had a BET specific surface area of 1960 m$^2$/g, and pore size distribution as calculated by BJH method shown in FIG. 3.

As shown in FIG. 3, the activated carbon having a peak a within the range of 2.1 to 2.4 nm in a pore diameter, a peak b within the range of 1.7 to 2.1 nm in a pore diameter, a peak c within the range of 1.4 to 1.7 nm in a pore diameter, and a peak d within the range of 1.1 to 1.4 nm in a pore diameter can be found. Area d was 3.90, area c was 1.66 and area b was 1.66, supposing that area a was 1, in which the area a, the area b, the area c, and the area d are each enclosed with pore diameter axis and distribution curve of each peak within the above pore diameter range.

It is recognized that pore size distribution can be controlled by addition of diiron trioxide to the coke as raw material in EXAMPLE 5 more effectively than by addition of no metallic compound in COMPARATIVE EXAMPLE 4.

Test cell with electrolytic solution of $(C_2H_5)_4NBF_4$/PC under 2.7 V charge and discharge at 25° C. had an electric capacity of 27.7 F/cm$^3$, the test cell at cryogenic temperature of −30° C. had an electric capacity of 24.5 F/cm$^3$. A capacitance retention ratio (=(electric capacity at −30° C.)/(electric capacity at 25° C.)) was 0.88.

EXAMPLE 6

Coal based pitch was heated at 500° C. in the atmosphere of nitrogen to carry out the first carbonization step. The resultant was heated at 630° C. for 1 hour in the second carbonization step to obtain coke as raw material having a true density of 1.47 g/cm$^3$. The obtained coke was crushed into a diameter of 0.5 mm or less.

Into 62.2 mg of copper oxide as compound containing element in the 11th group of the 4th period were added 10 g of water to obtain copper oxide slurry. Into the copper oxide slurry were added 5.0 g of the above coke as raw material, and fully mixed to obtain mixed slurry of the coke and copper oxide. The resultant mixed slurry was dried at 110° C. over night to obtain compound of the coke and copper oxide.

Into vessel made from nickel and having diameter of 40 mm were charged 5 g of the compound of coke and copper oxide and 15.7 g of potassium hydroxide (95%), and the vessel put in a batch type furnace for activation reaction. Air in the furnace was displaced by nitrogen, and then temperature increase was begun. While the furnace was heated, nitrogen gas with a flow rate of 0.5 l/min was bubbled in water having temperature of 50° C. to be provided together saturated water vapor into the furnace.

In the activation reaction, the temperature in the furnace was increased to 400° C. at a rate of 6.3° C./min, held at 400° C. for 30 minutes, elevated to 720° C. at a rate of 5.3° C./min and maintained at 720° C. for 15 minutes. After the activation reaction, the furnace was cooled from 720° C. to room temperature for 2 hours.

The activated carbon taken out from the furnace was filtered, and washed to eliminate an alkaline ingredient. Boiled acid washing with 0.1 mol/l of hydrochloride at 100° C. dissolved and eliminated metallic impurity such as copper and nickel attached on the activated carbon. Then boiled water washing at 100° C., filtering and water washing were repeated in turn for the activated carbon to be 10 ppm or less of residual chlorine in the activated carbon, and the purified activated carbon was dried at 110° C. over night.

The obtained activated carbon had a BET specific surface area of 1707 m$^2$/g, and pore size distribution as calculated by BJH method shown in FIG. 3.

As shown in FIG. 3, the activated carbon having a peak a within the range of 2.1 to 2.4 nm in a pore diameter, a peak b within the range of 1.7 to 2.1 nm in a pore diameter, a peak c within the range of 1.4 to 1.7 nm in a pore diameter, and a peak d within the range of 1.1 to 1.4 nm in a pore diameter can be found. Area d was 4.41, area c was 1.91 and area b was 1.87, supposing that area a was 1, in which the area a, the area b, the area c, and the area d are each enclosed with pore diameter axis and distribution curve of each peak within the above pore diameter range.

It is recognized that pore size distribution can be controlled by addition of copper oxide to the coke as raw material in EXAMPLE 6 more effectively than by addition of no metallic compound in COMPARATIVE EXAMPLE 4.

Test cell with electrolytic solution of $(C_2H_5)_4NBF_4$/PC under 2.7 V charge and discharge at 25° C. had an electric capacity of 27.1 F/cm$^3$, the test cell at cryogenic temperature of −30° C. had an electric capacity of 23.9 F/cm$^3$. A capacitance retention ratio (=(electric capacity at −30° C.)/(electric capacity at 25° C.)) was 0.88.

EXAMPLE 7

Coal based pitch was heated at 500° C. in the atmosphere of nitrogen to carry out the first carbonization step. The resultant was heated at 630° C. for 1 hour in the second carbonization step to obtain coke as raw material having a true density of 1.47 g/cm$^3$. The obtained coke was crushed into a diameter of 0.5 mm or less.

Into 83.2 mg of titanium dioxide as compound containing element in the 4th group of the 4th period were added 10 g of water to obtain titanium dioxide slurry. Into the titanium dioxide slurry were added 5.0 g of the above coke as raw material, and fully mixed to obtain mixed slurry of the coke as raw material and titanium dioxide. The mixed slurry was dried at 110° C. over night to obtain compound of the coke and titanium dioxide.

Into vessel made from nickel and having diameter of 40 mm were charged 5 g of the compound of coke and titanium dioxide and 15.7 g of potassium hydroxide (95%), and the vessel put in a batch type furnace for activation reaction. Air in the furnace was displaced by nitrogen, and then temperature increase was begun. While the furnace was heated, nitrogen gas with a flow rate of 0.5 l/min was bubbled in water having temperature of 50° C. to be provided together saturated water vapor into the furnace.

In the activation reaction, the temperature in the furnace was increased to 400° C. at a rate of 6.3° C./min, held at 400° C. for 30 minutes, elevated to 720° C. at a rate of 5.3° C./min and maintained at 720° C. for 15 minutes. After the activation reaction, the furnace was cooled from 720° C. to room temperature for 2 hours.

The activated carbon taken out from the furnace was filtered, and washed to eliminate an alkaline ingredient. Boiled acid washing with 0.1 mol/l of hydrochloride at 100° C. dissolved and eliminated metallic impurity such as titanium and nickel attached on the activated carbon. Then boiled water washing at 100° C., filtering and water washing were repeated in turn for the activated carbon to be 10 ppm or less of residual chlorine in the activated carbon, and the purified activated carbon was dried at 110° C. over night.

The obtained activated carbon had a BET specific surface area of 1707 m²/g, and pore size distribution as calculated by BJH method shown in FIG. 3.

As shown in FIG. 3, the activated carbon having a peak a within the range of 2.1 to 2.4 nm in a pore diameter, a peak b within the range of 1.7 to 2.1 nm in a pore diameter, a peak c within the range of 1.4 to 1.7 nm in a pore diameter, a peak d within the range of 1.1 to 1.4 nm in a pore diameter, a peak e within the range of 0.8 to 1.1 nm in a pore diameter, and a peak f within the range of 0.4 to 0.8 nm in a pore diameter can be found. Area f was 2.4, area e was 2.38, area d was 4.73, area c was 2.21 and area b was 2.03, supposing that area a was 1, in which the area a, the area b, the area c, the area d, the area e, and the area f are each enclosed with pore diameter axis and distribution curve of each peak within the above pore diameter range.

It is recognized that pore size distribution can be controlled by addition of titanium dioxide to the coke as raw material in EXAMPLE 7 more effectively than by addition of no metallic compound in COMPARATIVE EXAMPLE 4.

Test cell with electrolytic solution of $(C_2H_5)_4NBF_4/PC$ under 2.7V charge and discharge at 25° C. had an electric capacity of 24.9 F/cm³, test cell at cryogenic temperature of −30° C. had an electric capacity of 23.2 F/cm³. A capacitance retention ratio (=(electric capacity at −30° C.)/(electric capacity at 25° C.)) was 0.93.

COMPARATIVE EXAMPLE 4

A commercial activated carbon (MSP-20, produced by THE KANSAI COKE AND CHEMICALS Co. Ltd.) being alkaline activated carbon made of phenol based resin as raw material was used in the evaluation.

The activated carbon was 2210 m²/g in a specific surface area. Into the activated carbon were dry-compounded 9% by mass of carbon black and 10% by mass of polytetrafluoroethylene (PTFE), organic solvent was added to the compounded powder to swell the powder before kneading, and the kneaded powder was rolled and dried under reduced pressure at 200° C. to produce an electrode material. Test cell with electrolytic solution of $(C_2H_5)_4NBF_4/PC$ under 2.5V charge and discharge had an electric capacity at 25° C. of 39.2 F/g and 24.3 F/ml. A capacitance retention ratio (=(electric capacity at −30° C.)/(electric capacity at 25° C.)) was 0.61. Pore size distribution of the activated carbon was shown in FIG. 3.

bution as calculated measured by BJH method from $N_2$-adsorption isotherm at 77.4 K, having a peak a within the range of 2.1 to 2.4 nm in a pore diameter, a peak b within the range of 1.7 to 2.1 nm in a pore diameter, a peak c within the range of 1.4 to 1.7 nm in a pore diameter, and a peak d within the range of 1.1 to 1.4 nm in a pore diameter, and having area d of 3.7 to 4.8, area c of 1.6 to 2.3 and area b of 1.6 to 2.1, supposing that area a is 1, in which the area a, the area b, the area c, and the area d are each enclosed with pore diameter axis and distribution curve of each peak within the above pore diameter range.

And carbonization of pitch in the presence of chemical Z containing an element such as titanium can revealingly produce an activated carbon, in pore size distribution as calculated by BJH method from $N_2$-adsorption isotherm at 77.4K, having a peak a within the range of 2.1 to 2.4 nm in a pore diameter, a peak b within the range of 1.7 to 2.1 nm in a pore diameter, a peak c within the range of 1.4 to 1.7 nm in a pore diameter, a peak d within the range of 1.1 to 1.4 nm in a pore diameter, a peak e within the range of 0.8 to 1.1 nm in pore diameter, a peak f within the range of 0.4 to 0.8 nm in pore diameter, and having area f of 2.2 to 2.5, area e of 2.3 to 2.5, area d of 4.6 to 4.8, area c of 2.1 to 2.3 and area b of 1.9 to 2.1, supposing that area a is 1, in which the area a, the area b, the area c, the area d, the area e, and the area f are each enclosed with pore diameter axis and distribution curve of each peak within the above pore diameter range. And it can be found out that use of the activated carbon can produce an electric double layer capacitor having high retention ratio at cryogenic temperatures.

[Measurement of Gas Adsorption]

Adsorption for methane was measured at pressures ranging from normal pressure to 3.5 MPa.

Methane gas was provided into a deaerated container before a stable pressure, and the stable pressure in the container was measured. The amount of the inside methane was calculated from the measured pressure and volume of the container, was subtracted from the amount of the provided methane to determine the amount of methane gas adsorption.

EXAMPLE 8

Coal pitch having softening point of 86° C. was carbonized by first carbonization step at 500° C. (heating rate of 5° C./hr, holding period of 10 hours at 500° C.), and by second carbonization step at 550° C. (heating rate of 50° C./hr, holding

TABLE 2

| | | | | | Ex. 5 | Ex. 6 | Comp. Ex. 4 | Ex. 7 |
|---|---|---|---|---|---|---|---|---|
| raw materal for coke | | | | | coal pitch | coal pitch | phenol resin | coal pitch |
| added metallic comp. | | | | | $Fe_2O_3$ | CuO | none | $TiO_2$ |
| (metallic element conc. % by mass) | | | | | 1% | 1% | | 1% |
| ratio of area among peak curve, pore dia. axis and pore dia. range | pore dia. (nm) | peak f: | | 0.4-0.8 | — | — | — | 2.40 |
| | | peak e: | | 0.8-1.1 | — | — | — | 2.38 |
| | | peak d: | Range | 1.1-1.4 | 3.90 | 4.41 | — | 4.73 |
| | | peak c: | | 1.4-1.7 | 1.66 | 1.91 | — | 2.21 |
| | | peak b: | | 1.7-2.1 | 1.66 | 1.87 | — | 2.03 |
| | | peak a: | | 2.1-2.4 | 1.00 | 1.00 | — | 1.00 |
| elecric capacity (F/cm³) | | | | 25° C. | 27.7 | 27.1 | 24.3 | 24.9 |
| | | | | −30° C. | 24.5 | 23.9 | 14.8 | 23.2 |
| retention ratio (−30° C./25° C.) | | | | | 0.88 | 0.88 | 0.61 | 0.93 |

As shown TAB. 2, carbonization of pitch in the presence of chemical Z containing an element such as iron and copper can revealingly produce an activated carbon, in pore size distriperiod of 1 hour at 550° C., and cooling period of 100 hours), which was milled to obtain a graphitizable coke having an average diameter of 3.5 μm and a true density of 1.45 g/cm³.

With 1000 g of the coke were mixed 25 g of calcium carbonate powder with Henschel Mixer for 60 seconds to obtain a carbon powder. Potassium hydroxide 1.6 times as the carbon powder in mass were mixed with the carbon powder in a ball mill, and the mixture was filled into a container being 300 mm in length, 300 mm in width, 3 mm in thickness and 10 mm in height, made from nickel.

The container was heated in a batch type activation furnace (segmentation type furnace made by FUJI DEMPA KOGYO Co. Ltd.) under a heating rate of 10° C./min, holding period of 30 minutes at 400° C., and heated at 800° C. as maximum temperature for 15 minutes, in the atmosphere of nitrogen. The container was cooled to 100° C. or less in the atmosphere of nitrogen. The container was taken out from the furnace to obtain a reaction product. The reaction product was neutralized with 1N hydrochloride, and 2 boiled-acid washing operations with 0.1N hydrochloride were carried out to eliminate metallic impurity. And then 2 boiled-water washing operations with distilled water were carried out to eliminate residual chlorine and metallic impurity. This was dried at 110° C. with hot air flow, and passed through filter having mesh of 330 and magnetic separator (magnetic power 12000 G) to obtain activated carbon having average diameter of 4.6 μm.

The activated carbon was 1170 $m^2/g$ in specific surface area. As shown by curve K in FIG. 4, a peak at approximately 1.22 nm in a pore diameter appeared, the peak within the range of 1.0 to 1.5 nm in a pore diameter was 0.013 $cm^3/g$ that is 2% to total pore volume being 0.56 $cm^3/g$. The amount of methane gas adsorption of the activated carbon is shown in TAB. 3, and pore size distribution of the activated carbon is shown in FIG. 4.

EXAMPLE 9

Coal pitch having softening point of 86° C. was carbonized by first carbonization step at 500° C. (heating rate of 5° C./hr, holding period of 10 hours at 500° C.), and by second carbonization step at 660° C. (heating rate was 50° C./hr, holding period was 1 hour at 660° C., and cooling period from 660° C. to room temperature was 100 hours), which was milled to obtain a graphitizable coke having an average diameter of 3.5 μm and a true density of 1.51 $g/cm^3$. With 1000 g of the coke were mixed 10 g of calcium oxide powder and 5 g of calcium hydroxide with Henschel Mixer for 60 seconds to obtain a carbon powder. Potassium hydroxide 2.6 times as the carbon powder in mass were mixed with the carbon powder in a ball mill, and the mixture was filled into a container being 300 mm in length, 300 mm in width, 3 mm in thickness and 10 mm in height, made from nickel.

The container was heated in a batch type activation furnace (segmentation type furnace made by FUJI DEMPA KOGYO Co. Ltd.) under a heating rate of 10° C./min, holding period of 30 minutes at 400° C., and heated at 720° C. as maximum temperature for 15 minutes, in the atmosphere of nitrogen. The container was cooled to 100° C. or less in the atmosphere of nitrogen. The container was taken out from the furnace to obtain a reaction product. The reaction product was neutralized with 1N hydrochloride, and 2 boiled-acid washing operations with 0.1N hydrochloride were carried out to eliminate metallic impurity. And then 2 boiled-water washing operations with distilled water were carried out to eliminate residual chlorine and metallic impurity. This was dried at 110° C. with hot air flow, and passed through filter having mesh of 330 and magnetic separator (magnetic power 12000 G) to obtain activated carbon having average diameter of 4.4 μm.

The activated carbon was 1810 $m^2/g$ in specific surface area. As shown by curve L in FIG. 4, a peak at approximately 1.22 nm in a pore diameter appeared, the peak within the range of 1.0 to 1.5 nm in a pore diameter was 0.021 $cm^3/g$ that is 24% to total pore volume being 0.88 $cm^3/g$. The amount of methane gas adsorption of the activated carbon is shown in TAB. 3, and pore size distribution of the activated carbon is shown in FIG. 4.

EXAMPLE 10

Into coal pitch having softening point of 86° C. were added 30 g of calcium carbonate, this was carbonized by first carbonization step at 560° C. (heating rate of 5° C./hr, holding period of 10 hours at 560° C.), and by second carbonization step at 640° C. (heating rate was 50° C./hr, holding period was 1 hour at 640° C., and cooling period from 640° C. to room temperature was 100 hours), which was milled to obtain a graphitizable coke having an average diameter of 3.5 μm and a true density of 1.48 $g/cm^3$. Potassium hydroxide 3.0 times as the carbon powder in mass were mixed with the coke in a ball mill, and the mixture was filled into a container being 600 mm in diameter, 3 mm in thickness and 1050 mm in height, made from nickel.

The container was heated in a continuous activation furnace (Roller hearth kiln made by NORITAKE Co. Ltd.) under the heating rate of 5° C./min, holding period of 30 minutes at 400° C., and heated at 740° C. for 15 minutes, and then cooled to 100° C. or less in the atmosphere of nitrogen. The container was taken out from the furnace to obtain a reaction product. The reaction product was neutralized with 1N hydrochloride, and 3 boiled-acid washing operations with 0.1N hydrochloride were carried out to eliminate metallic impurity. And then 3 boiled-water washing operations with distilled water were carried out to eliminate residual chlorine and metallic impurity. This was dried at 110° C. with hot air flow, and passed through filter having mesh of 330 and magnetic separator (magnetic power 12000 G) to obtain activated carbon having average diameter of 4.5 μm.

The activated carbon was 2020 $m^2/g$ in specific surface area. As shown by curve M in FIG. 4, a peak at approximately 1.22 nm in a pore diameter appeared, the peak within the range of 1.0 to 1.5 nm in a pore diameter was 0.033 $cm^3/g$ that is 31% to total pore volume being 1.06 $cm^3/g$. The amount of methane gas adsorption of the activated carbon is shown in TAB. 3, and pore size distribution of the activated carbon is shown in FIG. 4.

COMPARATIVE EXAMPLE 5

An activated carbon was produced by the same manner as Example 10 except that the amount of calcium carbonate was changed to 17 g The activated carbon was 1570 $m^2/g$ in specific surface area. As shown curve N in FIG. 4, no peak within ranging from 1.0 to 1.5 nm in a pore diameter appeared. A pore volume at 1.22 nm in a pore diameter was 0.006 $cm^3/g$, that was 0.008% to total pore volume being 0.78 $cm^3/g$. The amount of methane gas adsorption of the activated carbon was 140 mg/g.

COMPARATIVE EXAMPLE 6

A grahitizable coke having average diameter of 3 μm was produced by the same manner as EXAMPLE 9.

An activated carbon was produced by the same manner as EXAMPLE 9 except that with 1000 g of the coke was not added any alkaline earth metallic compound, but alkali metallic compound (potassium hydroxide powder) only, and the mixture was activated.

The activated carbon was 2210 m$^2$/g in specific surface area. As shown by curve O in FIG. 4, no peak within the range of 1.0 to 1.5 nm in a pore diameter appeared. A pore volume at 1.22 nm in a pore diameter was 0.008 cm$^3$/g that was 0.9% to total pore volume being 0.92 cm$^3$/g. The amount of methane gas adsorption of the activated carbon is shown in TAB. 3, pore size distribution of the activated carbon is shown in FIG. 4.

TABLE 3

| | alkaline earth metallic element conc. (ppm) | BET S.S.A. (m$^2$/g) | pore vol. within 1.0 to 1.5 nm/ total pore vol. (%) | methane adsorption (mg/g) |
|---|---|---|---|---|
| Ex. 8 | 9760 | 1170 | 2.0 | 160 |
| Ex. 9 | 9700 | 1810 | 24.0 | 240 |
| EX. 10 | 11650 | 2020 | 31.0 | 270 |
| Comp. Ex. 5 | 6690 | 1570 | 0.008 | 140 |
| Comp. Ex. 6 | 0 | 2210 | 0.9 | 160 |

As shown in TAB. 3, it is found that the activated carbon (Ex. 8 to 10) having specific pore structure, which the highest peak D within the range of 1.0 nm to 1.5 nm in a pore diameter is from 0.012 to 0.050 cm$^3$/g and is from 2% to 32% to a total pore volume, has a high quantity in adsorption of methane gas, though the activated carbon has a small specific surface area. The activated carbon has excellent packing property in vessel such as tank, and has high ability of gas storage, so the activated carbon can be favorably employed for adsorbent of gas such as natural gas, having high value in the industry. The activated carbon in COMPARATIVE EXAMPLE 5 has small quantity of adsorption for methane gas. Though the activated carbon in COMPARATIVE EXAMPLE 6 performs the same quantity of adsorption for methane gas as that in EXAMPLE 8, the activated carbon in COMPARATIVE EXAMPLE 6 has a large specific surface area, which lowers packing property.

The invention claimed is:

1. An activated carbon having the highest pore volume peak being a peak D within the pore diameter range of 1.0 nm to 1.5 nm in pore size distribution, wherein the pore volume value of the peak D is 0.02 cm$^3$/g to 0.035 cm$^3$/g, wherein the pore size distribution is calculated by BJH method from N$_2$-adsorption isotherm at 77.4 K.

2. The activated carbon according to claim 1, having a specific surface area, as measured by BET method on N$_2$-adsorption, of 1500 m$^2$/g to 2200 m$^2$/g.

3. An activated carbon having the highest pore volume peak being a peak D within the pore diameter range of 1.0 nm to 1.5 nm, in which the pore volume value of the peak D is from 0.012 cm$^3$/g to 0.05 cm$^3$/g and is from 2% to 32% to a total pore volume, in pore size distribution as calculated by BJH method from N$_2$-adsorption isotherm at 77.4 K.

4. The activated carbon according to claim 3, having a specific surface area, as measured by BET method on N$_2$-adsorption, of 1100 m$^2$/g to 2200 m$^2$/g.

5. The activated carbon according to claim 1, having a peak C within the pore diameter range of 1.5 nm to 1.7 nm in pore size distribution.

6. The activated carbon according to claim 1, having a peak B within the pore diameter range of 1.7 nm to 2.0 nm in pore size distribution.

7. The activated carbon according to claim 1, having a peak A within the pore diameter range of 2.0 nm to 2.5 nm in pore size distribution.

8. An activated carbon, in pore size distribution as calculated by BJH method from N$_2$-adsorption isotherm at 77.4 K, having a peak a within the range of 2.1 mn to 2.4 nm in a pore diameter, a peak b within the range of 1.7 nm to 2.1 nm in a pore diameter, a peak c within the range of 1.4 nm to 1.7 nm in a pore diameter, and a peak d within the range of 1.1 nm to 1.4 nm in a pore diameter, and having area d of 3.7 to 4.8, area c of 1.6 to 2.3 and area b of 1.6 to 2.1, supposing that area a is 1, in which the area a, the area b, the area c, and the area d are each enclosed with pore diameter axis and distribution curve of each peak within the above pore diameter range.

9. An activated carbon, in pore size distribution as calculated by BJH method from N$_2$-adsorption isotherm at 77.4 K, having a peak a within the range of 2.1 nm to 2.4 nm in a pore diameter, a peak b within the range of 1.7 nm to 2.1 nm in a pore diameter, a peak c within the range of 1.4 nm to 1.7 nm in a pore diameter, a peak d within the range of 1.1 nm to 1.4 nm in a pore diameter, a peak e within the range of 0.8 nm to 1.1 nm in a pore diameter, and a peak f within the range of 0.4 nm to 0.8 nm in a pore diameter, and having area f of 2.2 to 2.5, area e of 2.3 to 2.5, area d of 4.6 to 4.8, area c of 2.1 to 2.3 and area b of 1.9 to 2.1, supposing that area a is 1, in which the area a, the area b, the area c, the area d, the area e, and the area f are each enclosed with pore diameter axis and distribution curve of each peak within the above pore diameter range.

10. A process of making an activated carbon according to claim 1, comprising steps of:

carbonizing pitch in the presence of 7000 ppm or more in metallic element concentration of chemical Z containing any of elements in the 2nd group, any of elements in the 3rd to 11th groups of the 4th period, or element in the 4th group of the 5th period on periodic table to obtain a graphitizable coke, activating the graphitizable coke in the presence of alkali metallic compound, and then washing the activated coke.

11. A process of making an activated carbon according to claim 1, comprising steps of:

carbonizing pitch to obtain a graphitizable coke, mixing the graphitizable coke with 7000 ppm or more in metallic element concentration of chemical Z containing any of elements in the 2nd group, any of elements in the 3rd to 11th groups of the 4th period, or element in the 4th group of the 5th period on periodic table to obtain mixture, activating the mixture in the presence of alkali metallic compound, and then washing the activated mixture.

12. The process of making an activated carbon according to claim 10, in which the graphitizable coke has a true density of 1.44 g/cm$^3$ to 1.52 g/cm$^3$.

13. The process of making an activated carbon according to claim 10, in which the pitch has softening point of 100° C. or less.

14. The process of making an activated carbon according to claim 10, in which the pitch comprises coal based pitch, petroleum based pitch, or organic solvent dissoluble constituent thereof.

15. The process of making an activated carbon according to claim 10, in which the chemical Z comprises simple substance or compound containing at least one element selected from the group consisting of Ca, Ti, Mn, Fe, Co, Ni, Cu, and Zr.

16. The process of making an activated carbon according to claim 10, in which the chemical Z comprises simple substance or at least one compound selected from the group consisting of oxide, hydroxide, chloride, bromide, iodide, fluoride, phosphate, carbonate, sulfide, sulfate and nitrate.

17. The process of making an activated carbon according to claim 10, in which the alkali metallic compound comprises alkali metallic hydroxide.

18. The process of making an activated carbon according to claim 10, in which the alkali metallic compound comprises a compound containing at least one element selected from the group consisting of K, Na and Cs.

19. A carbon composite powder comprising the activated carbon according to claim 1, and a carbon fiber.

20. The carbon composite powder according to claim 19, in which the carbon fiber has pore therein, a specific surface area of 10 $m^2/g$ to 50 $m^2/g$, an average diameter of fiber of 50 nm to 500 nm, and an aspect ratio of 5 to 1000.

21. A polarizable electrode comprising the activated carbon according to claim 1, carbon black, and binder.

22. A polarizable electrode comprising the activated carbon according to claim 1, carbon fiber, carbon black, and binder.

23. The polarizable electrode according to claim 22, in which the amount of the carbon fiber is 0.1% by mass to 20% by mass to that of the activated carbon.

24. The polarizable electrode according to claim 22, in which the carbon fiber has pore therein, a specific surface area of 10 $m^2/g$ to 50 $m^2/g$, an average diameter of fiber of 50 nm to 500 nm, and an aspect ratio of 5 to 1000.

25. The polarizable electrode according to claim 21, in which the binder comprises at least one polymer selected from the group consisting of polytetrafluoroethylene, polyvinylidenefluoride, rubber comprising acrylate monomer unit, and rubber comprising butadiene monomer unit.

26. An electric double layer capacitor comprising the polarizable electrode according to claim 21.

27. The electric double layer capacitor according to claim 26, comprising electrolytic solution dissolved at least one electrolytic salt selected from the group consisting of quaternary ammonium salt, quaternary imidazolium salt, quaternary pyridinium salt, and quaternary phosphonium salt into organic solvent, in which electrolytic cation is 3 Å to 15 Å in an ion size, and electrolytic anion is 5 Å to 10 Å in an ion size.

28. A slurry comprising the activated carbon according to claim 1.

29. A paste comprising the activated carbon according to claim 1.

30. An electrode sheet, in which the activated carbon according to claim 1 is applied onto the surface thereof.

31. A power supply system comprising the electric double layer capacitor according to claim 26.

32. A vehicle which contains the electric double layer capacitor according to claim 26.

33. A railroad which contains the electric double layer capacitor according to claim 26.

34. A ship which contains the electric double layer capacitor according to claim 26.

35. An aircraft which contains the electric double layer capacitor according to claim 26.

36. A portable apparatus which contains the electric double layer capacitor according to claim 26.

37. An apparatus for office work which contains the electric double layer capacitor according to claim 26.

38. A solar generation system which contains the electric double layer capacitor according to claim 26.

39. A wind power generation system which contains the electric double layer capacitor according to claim 26.

40. A communication apparatus which contains the electric double layer capacitor according to claim 26.

41. An electronic tag which contains the electric double layer capacitor according to claim 26.

42. An adsorbent comprising the activated carbon according to claim 1.

43. The adsorbent according to claim 42, which is for hydrocarbon gas having 1 to 4 of carbon atoms.

44. A preventing device from evaporating gasoline which contains the adsorbent according to claim 42.

45. to A stock tank for natural gas which contains the adsorbent according to claim 42.

46. A natural gas automobile which contains the adsorbent according to claim 42.

* * * * *